(12) United States Patent
Giron et al.

(10) Patent No.: US 12,705,851 B2
(45) Date of Patent: Aug. 11, 2026

(54) METHOD AND SYSTEM FOR DETECTING, QUANTIFYING, AND ATTRIBUTING GAS EMISSIONS OF INDUSTRIAL ASSETS

(71) Applicant: Kayrros, Paris (FR)

(72) Inventors: Clément Giron, Paris (FR); Matthieu Mazzolini, Paris (FR); Omar Dhobb, Paris (FR); Antoine Rostand, Paris (FR); Claire Bonfils-Bierer, Paris (FR); Jean Bastin, Paris (FR)

(73) Assignee: Kayrros, Paris (FR)

( * ) Notice: Subject to any disclaimer, the term of this patent is extended or adjusted under 35 U.S.C. 154(b) by 475 days.

(21) Appl. No.: 18/017,293

(22) PCT Filed: Jul. 23, 2021

(86) PCT No.: PCT/EP2021/070760
§ 371 (c)(1),
(2) Date: Jan. 20, 2023

(87) PCT Pub. No.: WO2022/023226
PCT Pub. Date: Feb. 3, 2022

(65) Prior Publication Data

US 2023/0316691 A1 Oct. 5, 2023

Related U.S. Application Data

(60) Provisional application No. 63/056,934, filed on Jul. 27, 2020.

(30) Foreign Application Priority Data

Feb. 4, 2021 (EP) .................................... 21305151

(51) Int. Cl.
*G06V 10/143* (2022.01)
*G06V 20/13* (2022.01)

(52) U.S. Cl.
CPC ............ *G06V 10/143* (2022.01); *G06V 20/13* (2022.01)

(58) Field of Classification Search
CPC ....... G01N 21/3504; G01N 2021/1795; G01N 21/359; G01N 2015/0046; G01N 33/225;
(Continued)

(56) References Cited

U.S. PATENT DOCUMENTS

2017/0097274 A1* 4/2017 Thorpe .................. G01C 15/00
2018/0188129 A1* 7/2018 Choudhury ............. G01M 3/04
(Continued)

OTHER PUBLICATIONS

Buchwitz. M. et al., "Satellite-derived methane hotspot emission estimates using a fast data-driven method" Atmospheric Chemistry and Physics, May 2017, pp. 5751-5774, vol. 17, Issue 9.
International Search Report for Application No. PCT/EP2021/070760 mailed Oct. 29, 2021, pp. 1-5.
Yongxue. L. et al., "Identifying industrial heat sources using time-series of the WIIRS Nightfire product with an object-oriented approach" Remote Sensing of Environment, Oct. 2017, pp. 347-365, vol. 204.
(Continued)

*Primary Examiner* — Sumati Lefkowitz
*Assistant Examiner* — Aaron Joseph Sorrin
(74) *Attorney, Agent, or Firm* — Lerner David LLP

(57) ABSTRACT

A method of monitoring synthetic gas emissions comprises obtaining a gas concentration image within a first area of interest from an overhead image acquisition device, detecting from the gas concentration image at least one gas plume of a synthetic gas emission, quantifying an emission rate of the detected gas plume, estimating an estimated point source of the detected gas plume, and attributing the detecting gas plume to an actual point source. A corresponding system for monitoring synthetic gas emissions comprises a memory storing a gas concentration image of a first area of interest, and a processor communicatively coupled thereto and configured to detect from the image of the gas concentration at least one gas plume of a synthetic gas emission, quantify an emission rate of the detected gas plume, estimate an esti-
(Continued)

mated point source of the detected gas plume, and attribute the detecting gas plume to an actual point source.

15 Claims, 10 Drawing Sheets

(58) Field of Classification Search
CPC . F01N 11/00; F02D 2041/225; G06V 10/143; G06V 20/13; G06V 20/17; G06V 20/194
See application file for complete search history.

(56) References Cited

U.S. PATENT DOCUMENTS

| | | | | |
|---|---|---|---|---|
| 2018/0292374 | A1 | 10/2018 | Dittberner et al. | |
| 2019/0113414 | A1* | 4/2019 | Tsuzuki | G01M 3/04 |
| 2019/0285600 | A1* | 9/2019 | Klein | G01M 3/22 |
| 2019/0376890 | A1* | 12/2019 | Bennett | G06T 7/73 |
| 2020/0116583 | A1* | 4/2020 | Hedberg | G01N 21/3504 |
| 2021/0247369 | A1* | 8/2021 | Nottrott | G01N 33/0047 |

OTHER PUBLICATIONS

Wooster. M. J. et al., "Thermal monitoring of Lascar Volcano, Chile, using infrared data from the along-track scanning radiometer: a 1992-1995 time series" Springer-Verlag, Bull Volcanol, Original Paper, Jan. 1997, pp. 566-579, vol. 58.

Van Damme. M. et al., "Global Distributions, time series and error characterization of atmospheric ammonia (NH3) from IASI satellite observations", Atmospheric Chemistry and Physics, Mar. 2014, pp. 2905-2922, vol. 14, Issue 6.

Extended European Search Report including Written Opinion for Application No. 21305151.9 dated Feb. 18, 2022, pp. 1-14.

Shupe. D. L. et al., "The Astropy Project: Building an Open-science Project and Status of the v2.0 Core Package*", The Astronomical Journal, Sep. 2018, pp. 1-19, vol. 156.

Jongaramrungruang. S. et al., "Towards accurate methane point-source quantification from high-resolution 2-D plume imagery", Atmospheric Measurement Techniques, Dec. 2019, pp. 6667-6681, vol. 12. Issue 12.

* cited by examiner

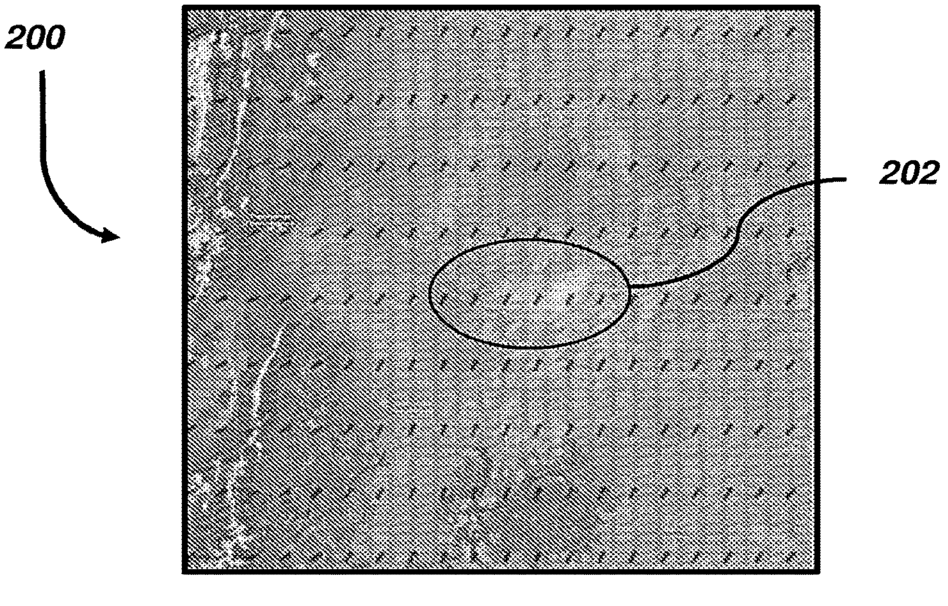
FIG. 2
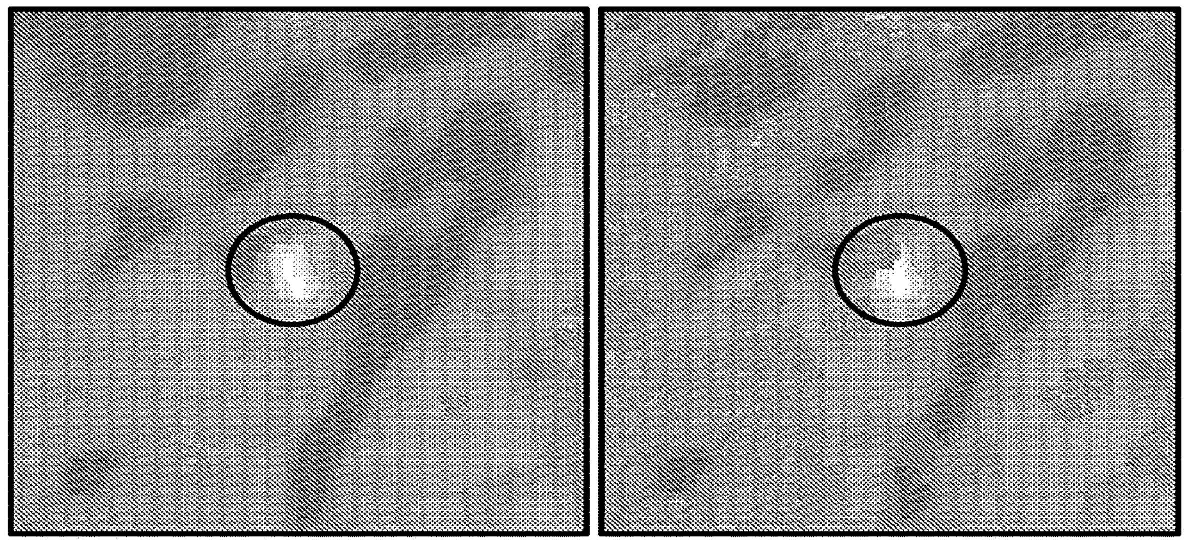
FIG. 3A
FIG. 3B

111

0
5
10
15
20
25
30
0 10 20 30

METHOD AND SYSTEM FOR DETECTING, QUANTIFYING, AND ATTRIBUTING GAS EMISSIONS OF INDUSTRIAL ASSETS

CROSS-REFERENCE TO RELATED APPLICATIONS

The present application is a national phase entry under 35 U.S.C § 371 of International Application No. PCT/EP2021/070760 filed Jul. 23, 2021, which claims priority from European Application No. 21305151.9, filed Feb. 4, 2021, and U.S. Provisional Application No. 63/056,934, filed Jul. 27, 2020 all of which are hereby incorporated herein by reference.

TECHNICAL FIELD

The present disclosure, in various embodiments, relates generally to a method and system of detecting, quantifying, and attributing synthetic gas emissions to a point source.

BACKGROUND

There is an increasing need for monitoring gas emissions of different industrial assets. Presently, gas emissions are monitored by self-reporting of owners of the industrial assets. The gas emissions are monitored by on-ground sensors that rely, for example, on manometry, infrared gas analysis, or titrimetry. However, being such monitoring devices are local sensing devices, monitoring of industrial assets and gas emissions therefrom is not scalable or possible on a global scale.

Other methods of monitoring gas emissions include estimating emissions based on a known throughput of an industrial process for a given industrial asset. In other words, such estimation methods take into account intentional and/or predicted gas emissions. However, the estimation methods do not take into account fugitive gas emissions such as leaks. Further, like the local sensing devices, such estimation methods are not scalable to a global scale.

BRIEF SUMMARY

Aspects of the present disclosure include a method of monitoring synthetic gas emissions comprising: obtaining an image of a gas concentration within a first area of interest from an overhead image acquisition device; detecting from the image of the gas concentration at least one gas plume of a synthetic gas emission; quantifying an emission rate of the detected gas plume; estimating an estimated point source of the detected gas plume; and attributing the detected gas plume to an actual point source.

Certain preferred but non-limiting features of the method described above are the following, taken individually or in combination:

- automatically generating a report of the detected gas plume, the emission rate, and the actual point source and transmitting the report to a user such that the user is provided with up-to-date information about regional or global synthetic gas emissions;
- the report further comprises at least one of a gas composition, a date of the gas emission, an identification of a party responsible for the actual point source, and a geographic location of the actual point source;
- automatically generating a graphical user interface indicating the detected gas plume, the emission rate, and the actual point source such that the graphical user interface provides up-to-date information about regional or global synthetic gas emissions;
- the graphical user interface further indicates at least one of a gas composition, a date of the gas emission, an identification of a party responsible for the actual point source, and a geographic location of the actual point source;
- attributing the gas plume to the actual point source comprises obtaining an infrared image of a second area of interest including the estimated point source and analyzing the infrared image to detect a gas emission from an amount of variation in infrared light intensity within the infrared image;
- attributing the gas plume to the actual point source comprises obtaining a time series of thermal images of a second area of interest including the estimated point source and analyzing the time series thermal image to detect a presence and/or an absence of a high intensity thermal spot, the absence of the high intensity thermal spot being indicative of the synthetic gas emission, the presence of the high intensity thermal spot being uncharacteristic of the synthetic gas emission;
- attributing the gas plume to the actual point source comprises obtaining a time series of SAR images of a second area of interest including the estimated point source and analyzing the time series of SAR images to detect a change in backscatter intensity proximate to the estimated point source, the change in backscatter intensity being indicative of the synthetic gas emission, a lack of change in backscatter intensity being uncharacteristic of the synthetic gas emission;
- attributing the gas plume to the actual point source comprises obtaining a time series of optical images of a second area of interest including the estimated point source and analyzing the time series of optical images to detect ground activity proximate to the estimated point source, the ground activity being indicative of the synthetic gas emission, a lack of ground activity being uncharacteristic of the synthetic gas emission;
- the second area of interest comprises a plurality of point sources of the gas plume, and wherein attributing the gas plume to the actual point source comprises obtaining geographic locations of the plurality of point sources and comparing a geographic location of the estimated point source to the geographic locations of the plurality to identify a closest geographic fit as the actual point source;
- at least one of the time series of thermal images, the time series of optical images, the time series of SAR image, and the infrared image is obtained by another overhead image acquisition device, the another overhead image acquisition device being different from the overhead image acquisition device;
- attributing the gas plume to the actual point source comprises obtaining additional images from another overhead image acquisition device, the another overhead image acquisition device being different from the overhead image acquisition device, the additional images comprise at least one of a time series of thermal images, a time series of optical images, and a time series of SAR image; and
- quantifying an emission rate of the detected gas plume comprises using at least one of a mass balance method, an integrated mass enhancement, and a cross-section method.
- obtaining meteorological data within the first area of interest corresponding to a time period during which the detected gas plume is estimated to be emitted, the meteorological data comprising a wind velocity and a wind direction for the time period, and quantifying the emission rate of the detected gas plume based on a displacement of the detected gas plume as a result of interaction of the detected gas plume with atmosphere; and detecting the gas emission comprises detecting a gas emission having a concentration above a background threshold such that natural gas emissions are not detected.

According to another aspect of the invention, a corresponding system is also proposed.

BRIEF DESCRIPTION OF THE DRAWINGS

FIG. 2 is a gas concentration image obtained according to the present disclosure;

FIGS. 3A and 3B are exemplary gas concentration images before and after pixel quality filtering according to the present disclosure;

DETAILED DESCRIPTION

Figure 1:
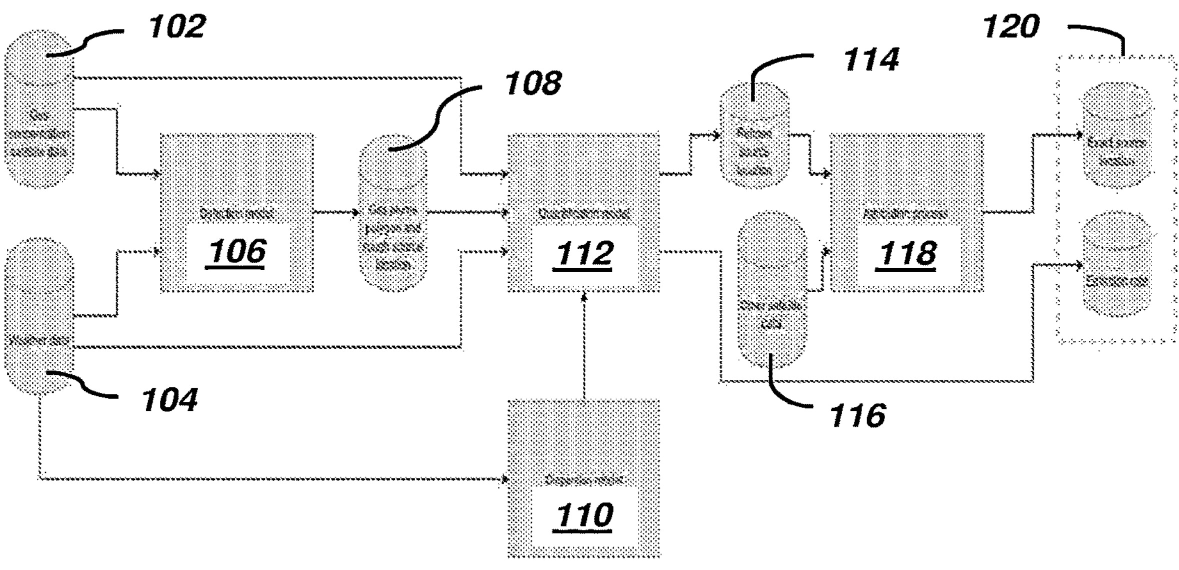
FIG. 1 illustrates a flow diagram illustrates various steps of a method according to the present disclosure.

The illustrations presented herein are not actual views of any particular component, device, or system, but are merely idealized representations employed to describe example embodiments of the present disclosure. The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, only those process acts and systems necessary to understand the embodiments of the disclosure are described in detail below. Additional conventional acts and systems may be used. Also note, any drawings accompanying the application are for illustrative purposes only, and are thus not drawn to scale. Additionally, elements common between figures may have corresponding numerical designations.

As used herein, the terms "comprising," "including," "containing," "characterized by," and grammatical equivalents thereof are inclusive or open-ended terms that do not exclude additional, un-recited elements or method steps, but also include the more restrictive terms "consisting of," "consisting essentially of," and grammatical equivalents thereof As used herein, the term "may" with respect to a system, structure, feature, or method act indicates that such is contemplated for use in implementation of an embodiment of the disclosure, and such term is used in preference to the more restrictive term "is" so as to avoid any implication that other compatible systems, structures, features, and methods usable in combination therewith should or must be excluded.

As used herein, the singular forms following "a," "an," and "the" are intended to include the plural forms as well, unless the context clearly indicates otherwise.

As used herein, the term "and/or" includes any and all combinations of one or more of the associated listed items.

The present disclosure relates to a system and method for detecting a gas emission of a target gas, quantifying the detected gas emission, and/or attributing the detected gas emission to a point source. The method may be employed to monitor emissions of industrial assets using one or more (e.g., a plurality of) remote-sensing devices. The monitored gas emissions may include greenhouse gases (GHG) and pollutants, which may be any gaseous substance that renders the air, soil, water, or other natural resource harmful or unsuitable for a specific purpose. Such gas emissions may be collectively referred to as "target gases" or "gas(es) of interest" herein.

Gas emissions monitored, quantified, and attributed according to the present disclosure may be unintentional gas emissions, which may be referred to in the art as fugitive emissions, and/or intentional gas emissions. By way of non-limiting example, methane emissions may occur in the oil and gas production industry as intentional emissions due to venting, which refers to the continuous bleed of gas from pneumatic devices that control gas flows, levels, temperatures, and pressures in production equipment, and as unintentional emissions due to leaks, which production equipment is damages and/or malfunctions.

As used herein, the term "synthetic emissions" or "synthetic gas emissions" refers to gas emissions that are manmade or unnatural and includes more intentional and unintentional gas emissions. Synthetic sources of gas emissions may include, but are not limited to, industrial assets such as power plants, oil and gas production sites, oil and gas refineries, mines, waste management sites, and agricultural crop and livestock production. Each industrial asset may comprise at least one gas emission source, which may also be referred to herein a "point source." As used herein, a "point source" refers to a single localized emitter of the target gas. By way of non-limiting example, an oil and gas production site may comprise a plurality of wells at which the target gas may be emitted when the oil and gas is extracted.

An advantage of the present method is that the method may be applied without knowledge a priori of a location of a point source of a gas emission. Thus, the method is suited for searching for, quantifying, and/or attributing synthetic gas emissions to one or more point sources.

Nonetheless, the present method may also be applied with knowledge a priori of the location of the point source of a gas emission. Accordingly, the method is suited for monitoring and quantifying gas emissions attributable to a given point source.

The system and method described herein may utilize one or more remote sensing devices to detect, quantify, and/or attribute the gas emission. As used herein, the term "remote sensing device" refers to a device configured to acquire information about an object, such as the point source, and/or a location, such as an area of interest, and that is movable relative to the object and/or the location such that the sensing device does not come into physical contact with the object and/or is not present within the location for which the device acquires information.

The remote sensing device(s) may be overhead image acquisition device(s). Overhead image acquisition devices may include satellites, planes, unmanned aerial vehicles (UAVs) or drones, and other aerial (e.g., airborne) imaging systems. By way of non-limiting example, when the overhead image acquisition device comprises a satellite, the overhead image acquisition device may be, but not limited to, WorldView-1/2/3/4, GeoEye, QuickBird, Pleiades-1A/B, Spot-6/7, Kompsat-3/3A, RapidEye, Planet Doves, Planet SkySats, Sentinel-2, Sentinel-5P, Aqua Airs-Modis, JAXA Greenhouse gas Observation Satellite (GOSAT), and NASA Orbiting Carbon Observatory (OCO-2, OCO-3), Landsat-7/8 and radar images from TerraSAR-X/TanDEM-X, COSMO-SkyMed, RadarSat-1/2, Kompsat-5, Alos-2, Sentinel-1, Capella, IceEye or UmbraLabs.

As explained in further detail below, different remote sensing devices may be utilized in various steps of the method. By utilizing remote sensing devices, such as overhead image acquisition devices, the present method is scalable and enables gas emissions of industrial assets to be monitored on a global scale.

On the other hand, the term "local sensing device" refers to a device configured to acquire information about an object and/or a location and that is stationary relative to the object and/or the location such that the sensing device is in physical contact with the object and/or is present within the location for which the device acquires information. Unlike the remote sensing devices, it is not economically feasible to scale local sensing devices and utilize local sensing devices to monitor gas emissions on a global scale.

FIG. 1 illustrates a flow diagram illustrates various steps of a method for detecting, quantifying, and attributing a gas emission according to embodiments of the present disclosure.

Figure 15:
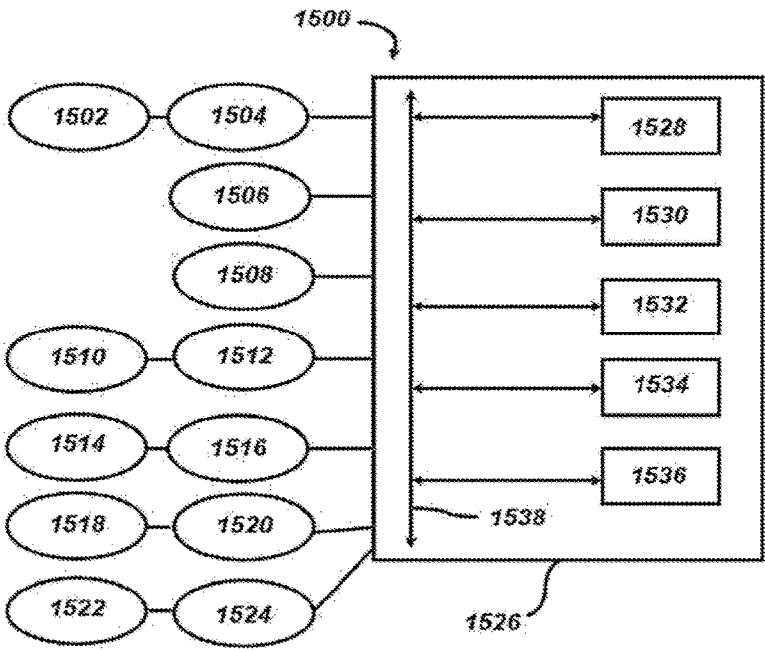
FIG. 15 is a schematic diagram of the general architecture of a system according to embodiments the present disclosure.

In a step 102, the method may comprise acquiring (e.g., obtaining) at least one gas concentration image from a first remote sensing device. More particularly, the method may comprise acquiring a gas concentration image from an overhead image acquisition device 1502 (FIG. 15). Step 102 may comprise acquiring coarse gas concentration data from the at least one overhead image acquisition device. The gas concentration image may be comprised of a plurality of pixels, wherein the pixels indicate a measure of a concentration of a target gas within a total atmospheric column or within a total tropospheric column.

Gas concentration images may be obtained from, but are not limited to, at least one of the Copernicus Sentinel-5P satellite, Aqua Airs-Modis satellites, JAXA Greenhouse gas Observation Satellite (GOSAT), and NASA Orbiting Carbon Observatory (OCO-2, OCO-3). The overhead image acquisition device may have a hyperspectral imaging device for acquiring the gas concentration image. The gas concentrations are generally measured in moles per square meter, parts per million, or parts per billion.

FIG. 2 illustrates an exemplary gas concentration image 200 obtained from the overhead image acquisition device in which gas concentrations are measured in parts per billion in the total atmospheric column. A gas plume 202 may be detected within the image 200. By way of non-limiting example, the image 200 may be obtained by a spectrometer known as the Tropospheric Monitoring Instrument (TROPOMI) from Sentinel-5 Precursor. TROPOMI is a pushbroom instrument with four hyperspectral channels covering the spectrum from ultraviolet to shortwave infrared.

The gas concentration image(s) may be automatically or manually obtained. The gas concentration images may be obtained on a continuous or periodic basis, such as hourly, daily, weekly, etc.

Such gas concentration image(s) may be obtained from a database of gas concentration images 1504 (FIG. 15).

Some of the gas concentrations detected by the overhead image acquisition device and depicted in the gas concentration images may be naturally occurring, while other detected gas concentrations may be attributable to synthetic emissions.

The gas concentration image may detect a plurality of distinct (e.g., separate) gas emissions. Such gas emissions may be attributable to distinct point sources. Of particular interest in this application, are the plurality of gas emissions produced by industrial assets.

The gas concentration image may depict gas concentrations in a first area of interest. In some embodiments, the first area of interest may include an entire geographic area for which the overhead image acquisition device obtains gas concentration data. For example, the first area of interest may be a global view such that all gas concentrations for a given date observed by the overhead image acquisition device are obtained in step 102. A plurality of estimated point sources for a gas emission having a gas concentration detected and measured by the present method may be located within the first area of interest. Therefore, through the steps of the method, an approximate area of interest and/or an estimated point source may be determined such that the another area of interest having a geographical area less than that of the first area of interest.

In step 104, the method may further comprise obtaining meteorological data (e.g., weather data) related to the first area of interest. Meteorological data may include obtaining wind velocity (e.g., wind speed and direction) information for the first area of interest. Meteorological data may also include atmospheric pressure, temperature, geopotential, humidity, and boundary layer height.

Meteorological data may include, but is not limited to, meteorological data is obtained from one or more meteorological databases 1506 (FIG. 15). The meteorological databases 1508 may obtain meteorological data from one or more remote sensing devices including overhead image acquisition devices. Such databases may include at least one of the National Oceanic and Atmospheric Administration (NOAA), European Centre for Medium-Range Weather Forecasts (ECMWF), the National Center for Environmental Prediction (NCEP), and Global Forecast System (GFS).

The meteorological data may be gridded data having a spatial resolution from 0.25 to 1 degree, inclusive, and the time resolution is one hour. In some embodiments, meteorological data may be obtained continuously and/or periodically.

FIG. 2 further illustrates wind velocity information obtained for the area of interest. The wind velocity is represented by a plurality of arrows in FIG. 2.

In step 106, the method may further comprise detecting at least one gas plume within the gas concentration image of step 102. The gas plume may be indicative of a synthetic gas emission.

The image of step 102 may comprise a plurality of gas emissions. In such embodiments, step 106 may comprise detecting a plurality of distinct gas plumes from distinct point sources. In such embodiments, the obtained image may be processed in order to identify and delimit distinct gas plumes.

To detect at least one gas plume within the gas concentration image, the obtained gas concentration image may be processed in order to delimit each gas plume within the gas concentration image.

In step 106, the method may include reprojecting of the gas concentration image onto a regular grid. The obtained gas concentration image may generally be obtained in a NetCDF4 or HDF5 format. Such a format enables different ground sample distances along the plurality of pixels of the image. To facilitate use of computer vision algorithms on the obtained images, the obtained images may be reprojected as rasters in tiff format. An example of an obtained image and a reprojected image are provided in FIGS. 3A and 3B, respectively. The gas concentration is encircled in FIGS. 3A and 3B.

Figures 4A, 4B:
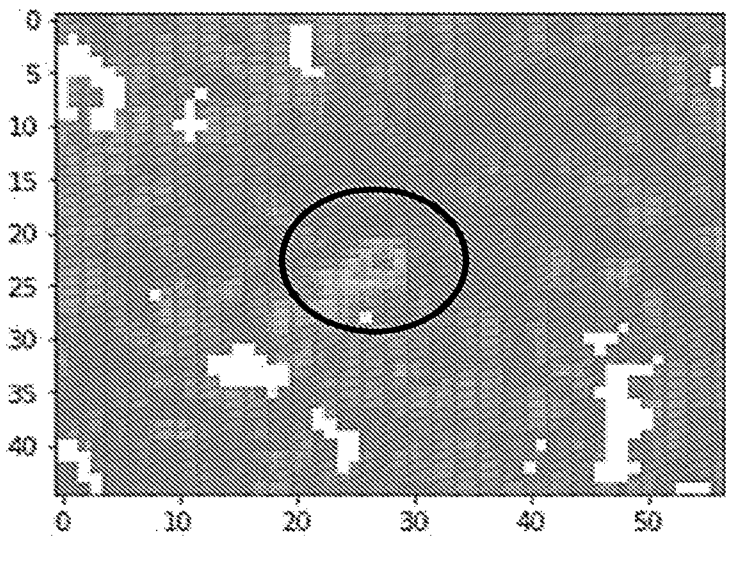
FIG. 4A is an example of a reprojected image before inpainting according to the method of the present disclosure.
FIG. 4B is an example of a reprojected image after inpainting according to the present disclosure.

As a result of cloud cover and/or other problematic meteorological conditions that prevent or hinder the detection of gas concentrations in the first area of interest, the reformatted image may include holes, or pixels for which gas concentration data could not be obtained. In step 106, the method may include applying an inpainting algorithm to the reprojected image. An example of a reprojected image before inpainting is provided as FIG. 4A and an example of a reprojected image after inpainting are illustrated in FIG. 4B. The gas concentration is encircled in FIGS. 4A and 4B.

In some embodiments, the method may comprise using a Biharmonic inpainting algorithm in step 106. In the Biharmonic inpainting algorithm, $u_{obs}$ is an observed signal or, here, the obtained gas concentration image containing holes and measurement noise. The biharmonic inpainting algorithm enables production of a reconstructed image, or a reconstructed signal $u_r$ with the following constraints:

$$\Delta^2 u_r = 0 \text{ and } u_{obs}(S) = u_r(S)$$

where S is the mask of pixels within the image without holes, and $\Delta^2 u_r$ is the second order Laplacian of the reconstructed signal. The first constrain $\Delta^2 u_r=0$ might be impossible due to the second constraint $u_{obs}(S)=u_r(S)$, then the problem is relaxed into minimizing $\|\Delta^2 u_r\|$ with respect to $u_{obs}(S)=u_r(S)$.

The Biharmonic inpainting assumes that the true image is smooth. The biharmonic assumption is the second order Laplacian of the reconstructed signal $\Delta^2 u_r=0$. The inpainting method assumes that gas concentrations detected in the gas concentration image are dispersed, due to interactions with the atmosphere, therefore, if a high quantity of gas is released at one location, the gas rapidly spreads to all neighboring pixels, even in windless conditions.

Other inpainting methods may be used in step 106. For example, other computer vision algorithms, such as a K-SVD algorithm or PatchMatch algorithm, may be used to inpaint the reprojected gas concentration image.

In step 106, the method may further comprise applying a plume detection algorithm to the inpainted image. FIGS. 5A-5E depict various steps of the plume detection algorithm. Stars in FIGS. 5A-5E indicate locations of estimated point sources located within an area of interest including the gas emission.

Figure 5A:
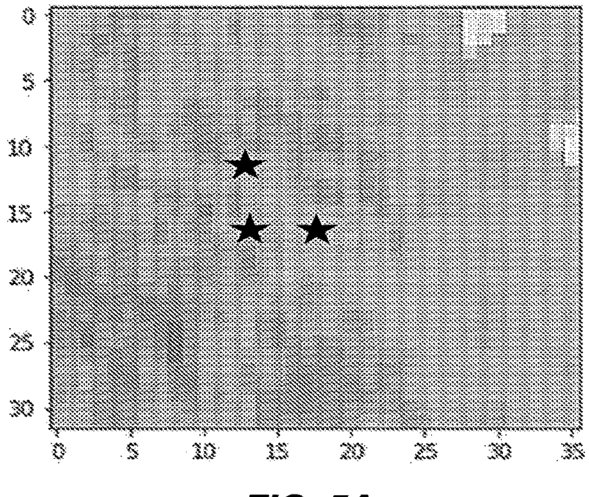
FIGS. 5A-5E depict various steps of the plume detection algorithm.
Figure 5A:
Figure 5B:
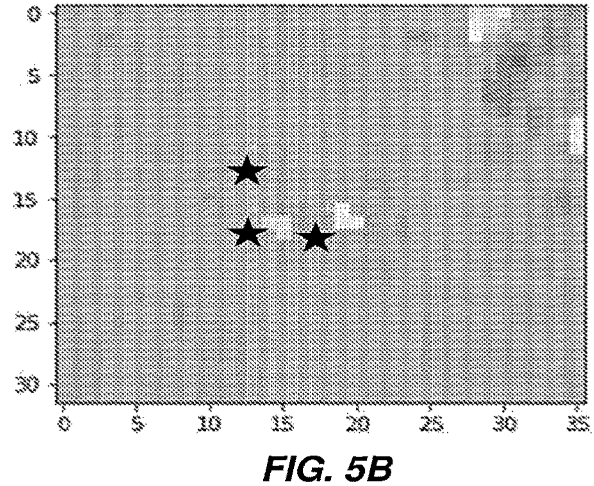

In step 106, the inpainted gas concentration image, as illustrated in FIG. 5A, may be taken as an input u and a background gas concentration may be removed from the image such the synthetic gas emissions above a background threshold are highlighted, as described in further detail below.

For a given inpainted image, a background value urn may be dynamically defined for each pixel of the image. To compute the background value urn, a convolution filter is applied to the inpainted gas concentration image (e.g., each pixel of the image). In some embodiments, a size of the convolutional filter may depend upon a resolution of the gas concentration image and/or a composition of the gas detected by the overhead image acquisition device.

The sum of the weights of the convolutional filter applied to the image u is 1. To accommodate any anisotropy in the inpainted gas concentration image, the weights may not be constrained to be equal to one another. Using a kernel of the same size, a local standard deviation may be computed for the neighbor for each pixel of the image, $u_\sigma$. A gas enhancement e of the gas concentration image may be defined as $e=\max(0, u-u_m+u_\sigma)$ where u is the inpainted gas concentration image, $u_m$ is the background value, and $u_\sigma$ is the local standard deviation. An obtained enhanced image is illustrated as FIG. 5B.

By applying the convolutional filter, edges of each gas plume depicted within the gas concentration image may be detected by means of a plurality of filters, and shapes of each gas plume depicted within the gas concentration image may be extracted as groups of contiguous pixels. Distinct gas plumes may be detected from groups of pixels delimited by contours and whose enhancement with the background are above a background threshold. The background threshold may be selected taking into consideration that some concentration of the target gas may be naturally present in the atmosphere. Therefore, a background threshold is selected such that gas emissions indicative of synthetic emissions are detected and such that natural gas emissions are not detected and other gases existing in the atmosphere in step 106.

Figure 5C:
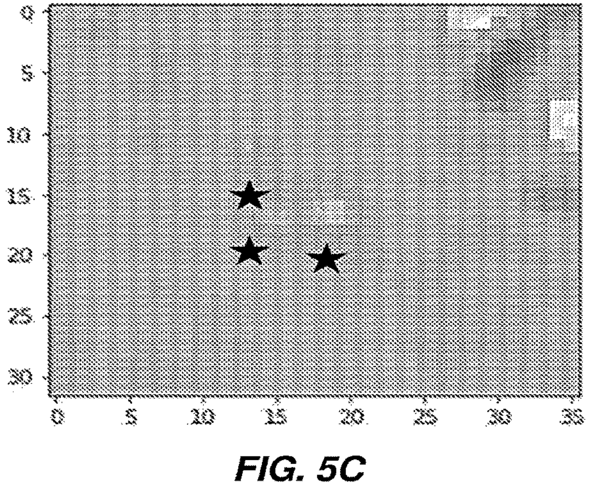

In a subsequent step, a gaussian kernel may be applied to the enhanced image e to obtain a denoised image, as illustrated in FIG. 5C.

In a further step, a sharpening kernel may be applied to the denoised image. In some embodiments, the sharpening kernel may be a normalized 3 by 3 convolutional kernel with a positive value at the center and negative values elsewhere. This method is intended to detect saddle points in the denoised image. In the method of the present disclosure, saddle points delineate distinct plumes that may be emitted by distinct point sources that are geographically close to each other. An exemplary sharpened image is illustrated in FIG. 5D.

Further, the detection model includes removing from the sharpened image those pixels below the previously determined background value such that the pixels remaining in the final image, as illustrated in FIG. 6E, represent pixels with high gas concentrations indicative of a gas emission. The plumes detected in the final image correspond to contiguous sets of pixels that are above the background threshold. If a set of saddle points sections a detected plume, it is divided into two plumes.

As a result of step 106, a gas plume is detected and a polygon of the gas plume (e.g., delineation of gas plume area) is output at step 108. Further, a geographic location in which the gas plume polygon is located is also output at step 108 as an estimated point source location.

Figures 5D, 5E:
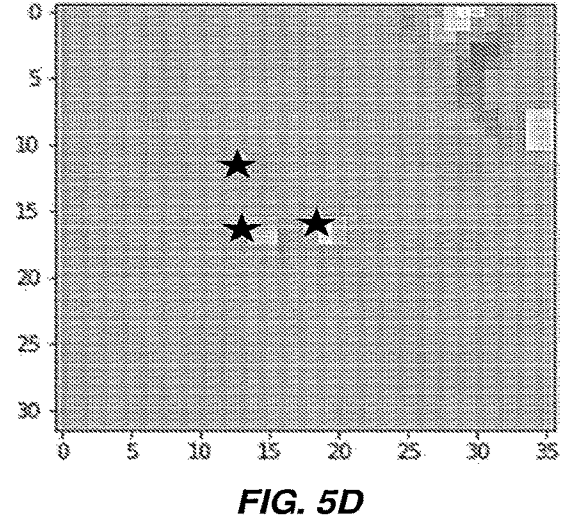

As shown by way of example, a plurality of gas plumes 111 are detected in FIG. 5E.

In step 112, the method may also comprise quantifying a gas emission rate of the detected gas plume of step 108.

In addition, a point of origin of the detected gas plume of step 108 may be further refined. In step 112, the method comprises estimating a point of origin of the at least one gas plume. The point of origin is estimated based on the assumption that any gas plume within the gas concentration image may be dispersed over time due to, for example, wind and other atmospheric interactions with the gas emission.

To estimate the point of origin of the detected gas plume, the method utilizes the meteorological data obtained at step 104. In some embodiments, the obtained meteorological data may be wind velocity over a period of time. The period of time considered may be a period before the gas concentration image is obtained. By way of non-limiting example, the wind speed and direction for a three-hour period before the gas concentration image of step 102 in which the gas plume is detected is obtained.

The obtained wind speed and direction data may be employed in a dispersion model obtained at step 110 from which the point of origin is estimated. The dispersion model may be one of, but is not limited to, the Hybrid Single Particle Lagrangian Integrated Trajectory ("HYSPLIT") model, the FLEXible PARTicle ("FLEXPART") dispersion model, or the Weather Research and Forecasting Model (WRF). Such models may take into consideration inputs such as emission source coordinates, emission time span, chemical characteristics of the emitted gas particles, etc.

In step 112, an emission rate for the at least one gas plume detected may be quantified (e.g., estimated). The emission rate is quantified based on a displacement of the detected gas plume as a result of interaction of the detected gas plume with the atmosphere.

Step 112 uses as an input the gas concentration image obtained in step 102 and prior to the inpainting step. Step 112 also uses as an input, the meteorological data obtained in step 104 and/or the dispersion model obtained in step 110.

In some embodiments, a mass balance method may be used to quantify a gas emission rate of the detected gas plume. The mass balance method used according to embodiments of the present disclosure may be a mass balance method as described in M. Buchwitz, et al., "Satellite-derived methane hotspot emission estimates using a fast data-driven method," *Atmospheric Chemistry and Physics Discussions*, pp. 1-40, 08 2016, which is hereby incorporated herein in its entirety by this reference.

The mass balance method may comprise simulating a plurality of gas emission plumes with emission rate $Q_\omega$ using one of the dispersion models previously discussed herein. The simulations must originate from a regular grid in the surroundings of the estimated point source of step 108 and having different time spans (e.g., different durations of gas emission).

The simulated gas plume that has the best fit to the detected gas plume in step 104 is found. The best simulated plume is the one maximizing the following quantity:

$$A(P_d \cap P_s)/A(P_d \cup P_s)$$

wherein A(·) is the function giving a ground area of a georeferenced polygon, $P_d$ is a polygon delineating the detected plume output in step 108, and $P_s$ is a polygon delineating the simulated plume. Note that this "intersection over union" method purposely does not take into account the value of the simulated pixels and observed pixels. The emission rate Q of the detected gas plume is computed as $$Q=Q_\omega \times X/X_\omega$$

Where X and $X_\omega$ are gas enhancements (e.g., surplus of gas in atmosphere resulting from synthetic gas emission) of the detected plume and simulated plume, respectively, and $Q_\omega$ is the simulated gas emission rate. The mass balance method enables the emission rate to be determined and another point of origin to be estimated concurrently.

In addition to or as an alternative to the mass balance method, an integrated mass enhancement (IME) method may be used to quantify a gas emission rate of the detected gas plume. The IME method used according to embodiments of the present disclosure may be the IME method as described in D. J. Varon, et al., "Quantifying methane point sources from fine-scale satellite observations of atmospheric methane plumes," *Atmospheric Measurement Techniques*, vol. 11, no. 10, pp. 5673-5686, 2018, which is hereby incorporated in its entirety by this reference.

The IME method relates an emission rate Q to a total detected plume mass IME. The IME method uses plume enhancements ΔΩi[mol×m2] observed over i∈[1, N] plume pixels with area $A_i$[m$^2$], an effective wind speed $U_{eff}$[m×s$^{-1}$], and a plume length scale L[m] to estimate the emission rate Q:

$$Q=U_{eff}L^{-1}\Sigma_i \Delta\Omega_i A_i$$

Figure 6:
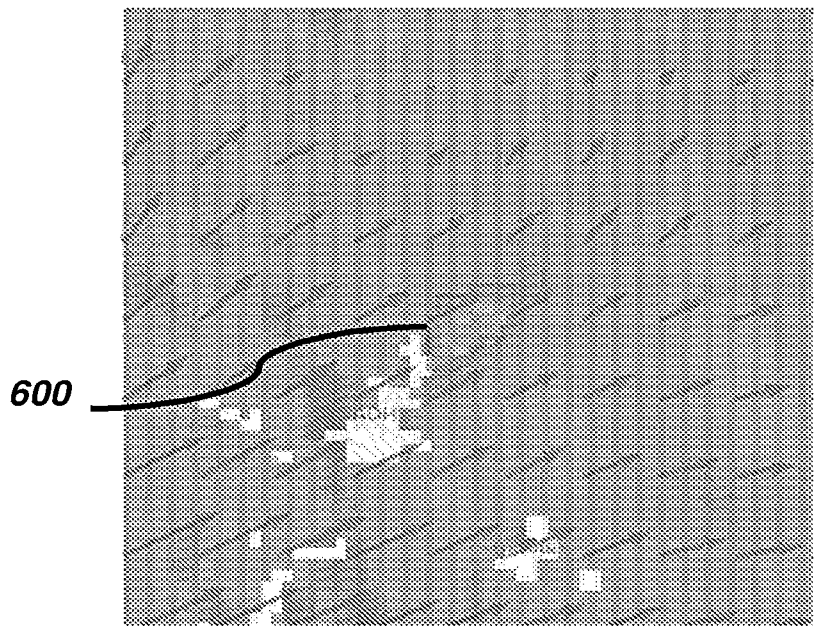
FIGS. 6 and 7 are images depicting gas emission rate estimation methods according to the present disclosure.

Here, N is obtained with a boolean plume mask (indicated by dark outline 600 of gas emission) that distinguishes plume pixels from background pixels in the gas concentration image of step 102, and L is defined as the square root of the total plume area detected in step 106. According to methods of the present disclosure, plumes may be mixed over the entire Planetary Boundary Layer (PBL), such that $U_{eff}$ is taken to be equal to a local wind speed, which is representative of the average PBL wind (indicated by arrows). An example of an application of the IME method for a gas concentration image is shown in FIG. 6.

Figure 7:
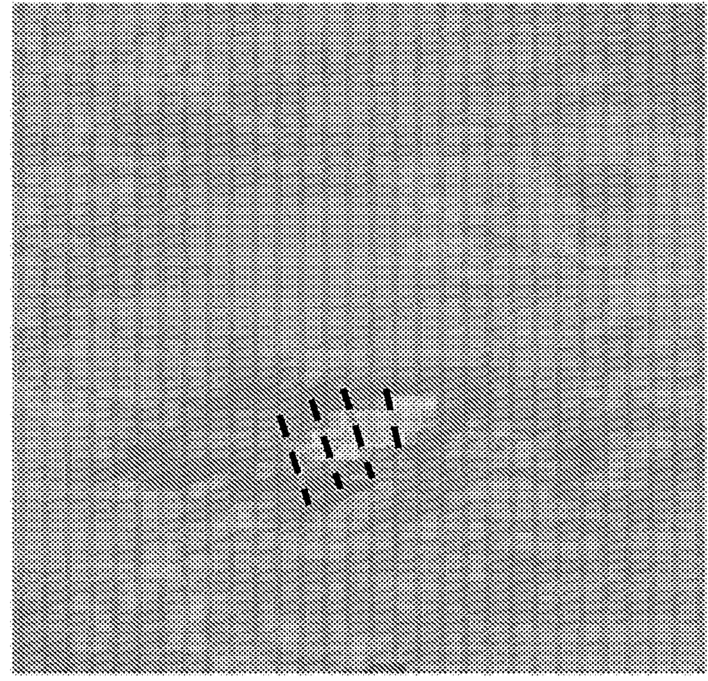

In addition to or as an alternative to the mass balance method and/or the IME method, a cross-section method may be used to quantify a gas emission rate of the detected gas plume and/or relates the source rate to the plume mass visible on the satellite image. The cross-section method relies on the idea that the emission rate is equal to amount of gas crossing any transect of the detected plume in the wind direction (indicated by arrows) at the time the gas concentration image is obtained. In order to get a robust measure, the cross-section method uses as many transects (indicated by dashed lines in FIG. 7) as possible and defines the emission rate as an average of all the estimated flows. In the formula, the x axis as the direction of the plume and the y axis perpendicular to x. The formula of the cross-section method is:

$$Q = CU_{eff} = U_{eff}/M\sum_{j=1}^{M}\int \Delta\Omega(x_j, y)dy$$

where C denotes the mean gas concentration along the considered transects, M is the number of transects, $x_j$, j∈[1, M] are the coordinates of the transects along the plume direction and $U_{eff}$ is the effective wind speed. An example of an application of the cross-section method for a gas concentration image is shown in FIG. 7.

As previously stated, one or more methods for estimating a gas emission rate may be used in the method of the present disclosure. As a result, it is possible to assess with greater consistency and less uncertainty the gas emission rate.

The output of step 112 thus includes an estimated point source and a gas emission rate for the gas plume detected in step 106.

In step 118, the detected gas plume may be attributed to an actual point source. The attribution step 118 may comprise detecting activity indicative of gas emissions within a second area of interest. The second area of interest includes a geographical area in which the previously estimated point sources from step 108 and/or step 114 are located. Further, the second area of interest is within the first area of interest.

In step 116, at least one image is obtained from at least one overhead image acquisition device. The at least one image depicts the second area of interest in which the estimated point sources from step 108 and/or step 114 are located.

The second area of interest includes a geographical area that is smaller than a geographical area of the first area of interest. Accordingly, the overhead image acquisition device(s) utilized to obtain images according to the method of step 116 may be selected to have a higher resolution than the remote sensing devices utilized to obtain images according to the method of step 102.

To attribute detected gas emission to an actual point source, a list of industrial assets and point sources of the industrial assets, including geographic locations thereof, within the second area of interest may be obtained in step 116. Such list may be derived from at least one target gas database 1508 (FIG. 15). The target gas database 1508 may be a public and/or private source of information relating to point sources of a target gas. By way of example, industries in which synthetic greenhouse gases are emitted may be regulated, and the location of industrial assets and point sources of synthetic gases thereof may be reported to regulating agencies, such as the US Environmental Protection Agency. Such agencies maintain databases from which the method of the present disclosure may obtain information about point sources located in the second area of interest.

Figure 8:
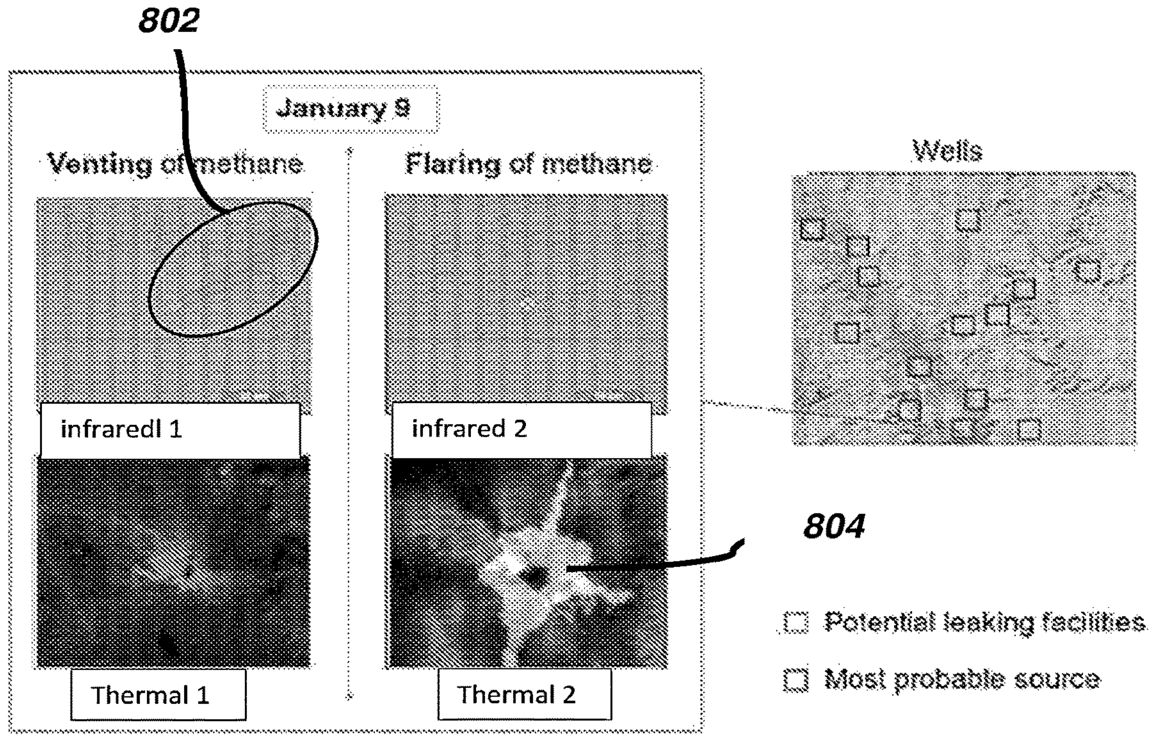
FIG. 8 illustrates optical images and thermal images according to the present disclosure.

The estimated point source may be compared to a known geographic location of one or more point sources with the second area of interest in step 118. The detected gas plume may be attributed to the point source geographically closest to the estimated point source from step 108 and/or step 114. The list of industrial assets may be filtered depending on industry type. For example, the list of industrial assets may be narrowed to include only those industrial assets known to emit the type of gas detected in the gas concentration image of step 102. By way of example and not limitation, when the type of gas detected is methane, the list of industrial assets may be narrowed to oil and gas production sites, such as refineries, oil and gas transmission sites, such gas pipelines, and/or waste management sites, such as landfills. A given industrial asset may comprise one or more point sources. For example, a plurality of wells may be located within a single oil and gas production site as illustrated in FIG. 8, wherein the plurality of wells are indicated by the plurality of squares.

In addition to or as an alternative to the foregoing step, in step 116, the method may further comprise obtaining at least one optical image of the second area of interest acquired by an overhead image acquisition device 1510. Such optical image(s) may be obtained from a database of optical images 1512 (FIG. 15).

To attribute the detected gas emission to the actual point source, the optical image may be analyzed in step 118 to detect ground activity within the second area of interest and to determine with respect to which point source in the second area of interest the detected ground activity is associated. By way of example, the optical image may be assessed to detect the presence and/or absence of personnel and/or equipment close to one or more point sources in the second area of interest. The presence of personnel and/or equipment geographically close to a particular point source in the second area of interest may be indicative of a ground activity for which the type of gas detected in the gas concentration image is known to be emitted. For example, the presence of personnel and/or equipment may be indicative of a repair of a point source within the second area of interest. A repair may be necessary where the point source, such as an oil and gas well, has been damaged, and as a result of the damage, is leaking the target gas.

In addition to or as an alternative to the foregoing steps, in step 116, the method may further or alternatively comprise obtaining at least one thermal image of the second area of interest acquired by an overhead image acquisition device 1514 from a database of thermal images 1516 (FIG. 15). In some embodiments, a time series of thermal images of the second area of interest may be obtained. Exemplary thermal images are shown in FIG. 8 (labeled Thermal 1 and Thermal 2).

In step 118, the method may further or alternatively comprise analyzing the at least one thermal image of the second area of interest to detect a presence and/or absence of a high intensity thermal spot.

Areas of intense thermal radiation (thermal 2) within the obtained images may be indicative of gas burning or, more particularly, may be indicative of the presence of a gas flare 804. For example, in the oil and gas production process, a gas flare is utilized as a gas combustion device so as to convert methane gas into carbon dioxide. Gas flares may also be utilized at oil and gas extraction sites such as oil and/or gas wells, offshore oil and gas rigs, and landfills.

The detection of areas of intense thermal radiation (e.g., high intensity thermal spots) may be indicative of the presence of a gas flare. Accordingly, the point source at which the gas flare is detected may be eliminated as the actual point source of the gas emission. Alternatively, areas of relatively low thermal radiation (e.g., low intensity thermal spots) may be indicative of the absence of a gas flare. For example, methane gas may leak from and be emitted into the atmosphere when the gas flare is not presence.

The time series of thermal images may be analyzed to identify an absence of the high intensity thermal spot, which is indicative of a synthetic gas emission, and/or to identify a presence of the high intensity thermal spot, which is uncharacteristic of a synthetic gas emission. If the thermal image indicates the absence of thermal radiation attributable to a gas burning event coinciding with a date and/or time of the gas plume detected in the second area of interest, the detected gas emission may be attributed to the point source for which the gas burning event is not detected. If the thermal image indicates the presence of thermal radiation attributable to the gas burned event at the date and/or time of the gas plume detected in the second area of interest, the detected gas emission is not attributed to the point source for which the gas burning event is detected.

In addition to or as an alternative to the foregoing steps, in step 116, may further or alternatively comprise obtaining at least one SAR images of the second area of interest acquired by an overhead image acquisition device 1518 from a database of SAR images 1520 (FIG. 15). In some embodiments, a time series of SAR images of the second area of interest may be obtained. The SAR images obtained may include SAR images taken before, during, and/or after the gas concentration image is obtained.

The SAR images capture a surface backscattering. The backscatter intensity may vary as a result of the presence and/or absence of people and/or equipment within the second area of interest and/or close to a particular point source within the second area of interest. In step 118, the method may comprise analyzing the at least one SAR image to detect a change in backscatter intensity within the at least one SAR image. A change in backscatter intensity between one or more SAR images within the time series of SAR images obtained may be indicative of ground activity correlated to (e.g., related to) a gas emission.

Accordingly, the change in backscatter intensity may be indicative of a synthetic gas emission, and a lack of change in backscatter intensity may be uncharacteristic of the synthetic gas emission. The geographic location of the change in backscatter intensity may be compared to the geographic location of the point source(s) in the second area of interest. The detected gas emission may be attributed to the point source closest to which ground activity is detected by the change in backscatter intensity from the SAR images.

As previously discussed with reference to the optical images, the presence of personnel and/or equipment geographically close to a particular point source in the second area of interest may be indicative of an industrial activity for which the type of gas detected in the gas concentration image is known to be emitted. For example, the presence of personnel and/or equipment may be indicative of a repair of a point source within the second area of interest. A repair may be necessary where the point source, such as a oil and gas well, has been damaged, and as a result of the damage, is leaking the target gas. Accordingly, the gas emission may be attributed to a location of a change in the backscatter intensity detected within the SAR images.

In addition to or as an alternative to the foregoing steps, in step 116, the method may further or alternatively comprise obtaining at least one SWIR images of the second area of interest acquired by an overhead image acquisition device 1522 from a database of SWIR images 1524 (FIG. 15). The SWIR images may be obtained, for example, from an infrared sensor of the WorldView 3 satellite and/or the Sentinel-2 satellite. In some embodiments, a time series of SWIR images may be obtained. For example, SWIR images of the second area of interest may be obtained for a time before, after, and/or during which the gas emission is detected in the gas concentration image of step 102.

Figure 9:
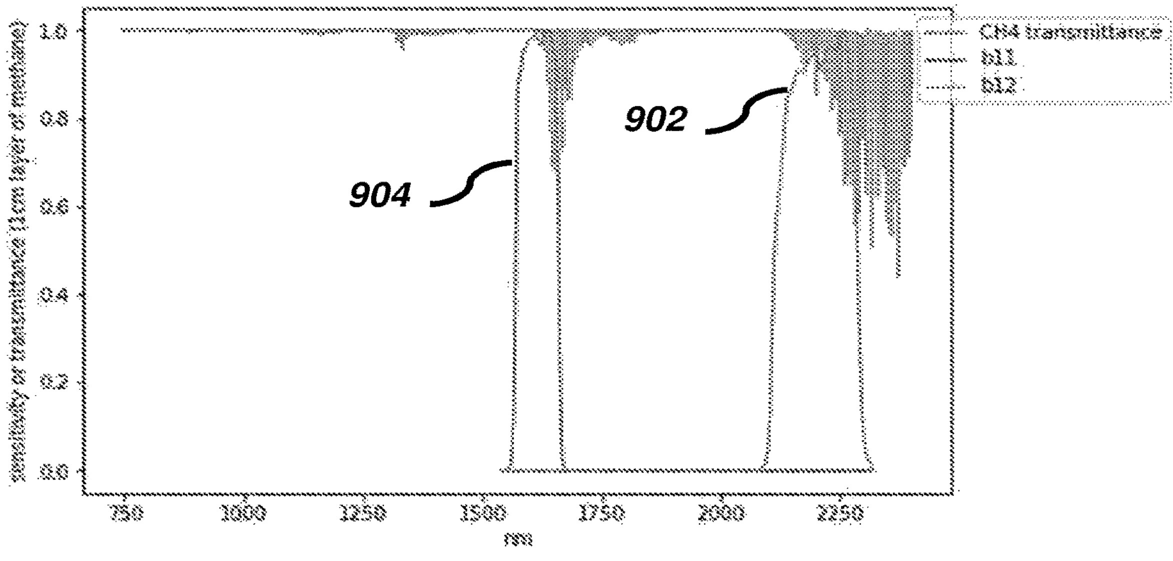
FIG. 9 is a frequency response curve for an infrared sensor plotting sensitivity of the infrared sensor of infrared bands and methane transmittance as a function of wavelength.

The method further comprises obtaining a relative radiometric response curve for the SWIR-bands captured by the infrared sensor. The relative radiometric response curve may be plotted along with transmittance of the gas detected in the gas concentration image in a plot of the sensitivity of the sensor together with transmittance of the gas at a given optical path length as a function of wavelength of infrared light. Such a plot is provided herewith as FIG. 9.

From the relative radiometric response curve, the method may further comprise calculating (e.g., determining) an amount of light collected by at least one SWIR band of the sensor in a fully transparent environment. More particularly, the method may comprise calculating an amount of infrared light collected by an active band 902 in a fully transparent environment and an amount of light collected by a reference band 904 in the fully transparent environment. As used herein, the term "active band" refers to an infrared band having the active wavelength such that infrared light is absorbed by the gas emission in the active band. As used herein, the term "reference band" refers to another infrared band (e.g., an infrared band different from the active band) having the reference wavelength such that infrared light is either fully transmitted through the gas emission in the reference band or such that infrared light is absorbed to a lesser extent than in the active band.

For a given SWIR band (e.g., the active band or reference band), the calculated value for a given SWIR band is referred to herein as a "reference effective sensor frequency response". For a given SWIR band of the sensor, the integral of the response curve is a measure of the amount of light that is collected by the sensor within the given SWIR band in a fully transparent environment (e.g., wherein no light is absorbed).

The method may further comprise calculating (e.g., determining) an effective sensor frequency response for at least one SWIR band captured by the sensor in an environment containing the emitted gas. More particularly, the method may comprise calculating the amount of infrared light collected by the at least one active band in the emitted gas and an amount of light collected by the at least one reference band in the emitted gas.

Figure 10:
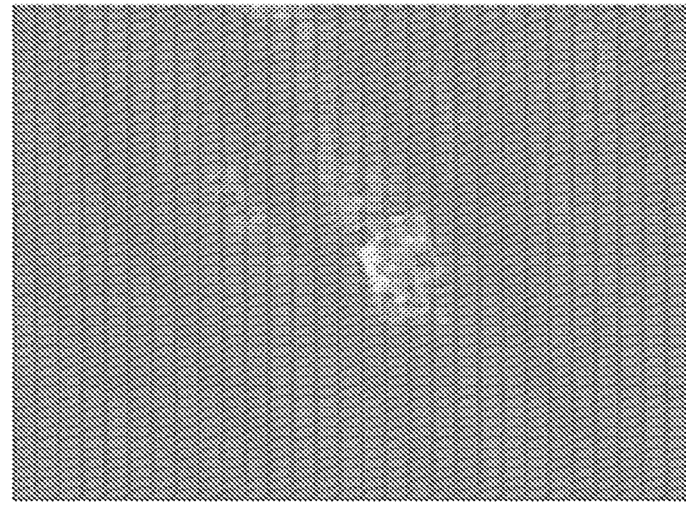
FIG. 10 is an optical image obtained according to the present disclosure.

As used herein, the "effective sensor frequency response" refers to an amount of infrared light collected by the at least one SWIR band (e.g., the active band or reference band) of the sensor in an environment containing the emitted gas. The effective sensor frequency response is obtained by combining the frequency response curve of the at least one SWIR band with the transmittance of the emitted gas (here, methane gas), as illustrated in FIG. 10. In other words, the effective sensor frequency response of a given SWIR band may be calculated as the product of the emitted gas transmittance function and sensor frequency response over the given SWIR band. For a given SWIR band, the area under the frequency response curve and under the emitted gas transmittance function is a measure of the amount of infrared light that is collected by the sensor in the presence of methane.

Accordingly, the method of the present disclosure may further comprise processing of the obtained SWIR image to determining an amount of attenuation of infrared light therein. An amount of attenuation of infrared light may be correlated to a concentration of the emitted gas in the obtained image using the previously calculated dimming function.

In order to determine an amount of infrared light absorption in each pixel of the image, the method may further comprise calculating a linear combination of logarithms of each SWIR band of the infrared sensor. Coefficients of the logarithms of the SWIR bands that are more affected by the gas emission (e.g., the active band(s)) are positive, while coefficient of the logarithms of the SWIR bands that are less affected by the gas emission (e.g., the reference band(s)) are negative. The coefficients of the logarithms of the SWIR bands are computed by an optimization algorithm based on a correlation of the SWIR bands and on the gas absorption spectra so as to maximize the signal-to-noise ratio of the resulting image.

Figure 11:
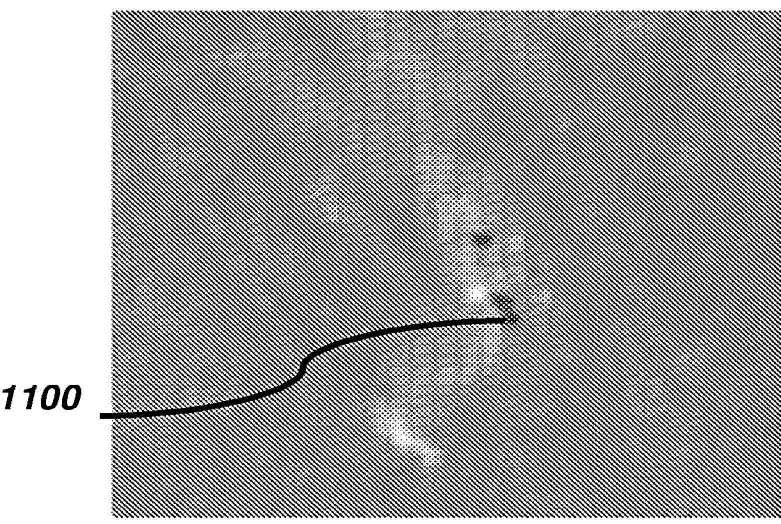
FIG. 11 is an infrared image obtained according to the present disclosure.

The method may comprise determining a ratio of the infrared light intensity of at least one active band image to the infrared light intensity of at least one reference band image. By dividing at least one active band by at least one reference band, objects that absorb infrared light in the active band(s), including methane gas, are highlighted while the remaining elements in the obtained image are smoothed (e.g., muted). Based on this ratio, an image is obtained in which the gas emission is highlighted. FIG. 11 is an infrared image in which the gas emission 1100 is highlighted. A geographic location of the gas emission may be determined. FIG. 8 also illustrates infrared images in which a gas emission 802 is detected (infrared 1) and the gas emission is not detected due to flaring, which is indicated by a high intensity thermal signal.

Subsequently, a geographic location of the gas emission detected in the SWIR images may be correlated to the geographically closest location of the estimated point source from step 108 and/or step 114. Accordingly, the detected gas emission may be attributed to the point source from which the gas emission detected in the SWIR images is emitted.

In some embodiments, a plurality of gas plumes may be detected in step 108. In some embodiments, one or more of the detected plumes may be spatially and/or temporally related. Put differently, one or more of the detected plumes, while being distinct emissions, may be related to a gas emission event. A gas emission event refers to synthetic gas emission, such as a leak, that occurred over time such that a plurality of detected plumes may originate from the same point source. Accordingly, the method may further comprise identifying detected gas plumes that may be related to a gas emission event. The plurality of detected gas plumes may then be attributed to a point source according to the method previously described herein In other embodiments, the detected plumes may not be related to a common synthetic gas emission event. In such embodiments, the methods of quantifying and attributing the detected gas plume to a point source may be repeated for each gas plume detected in step 106.

In step 120, as the detected gas emission(s) is/are attributed to the point source, the gas emission and the point source thereof may be reported to a user of the method and/or system of the present disclosure. In step 120, the report may be automatically generated and transmitted to a user such that the user is provided with up-to-date information about regional or global synthetic gas emissions. The report may include the gas emission rate and point source. The report may also comprise at least one of a gas composition, a date of the gas emission, an identification of a party responsible for the actual point source, and a geographic location of the point source.

Alternatively or additionally, in step 120, a graphical user interface user interface indicating the detected gas plume, the emission rate, and the actual point source may be automatically generated and provided to a user such that the graphical user interface provides up-to-date information about regional or global synthetic gas emissions. The graphical user interface may also comprise information pertaining to at least one of a gas composition, a date of the gas emission, an identification of a party responsible for the actual point source, and a geographic location of the point source.

Figures 12, 13:
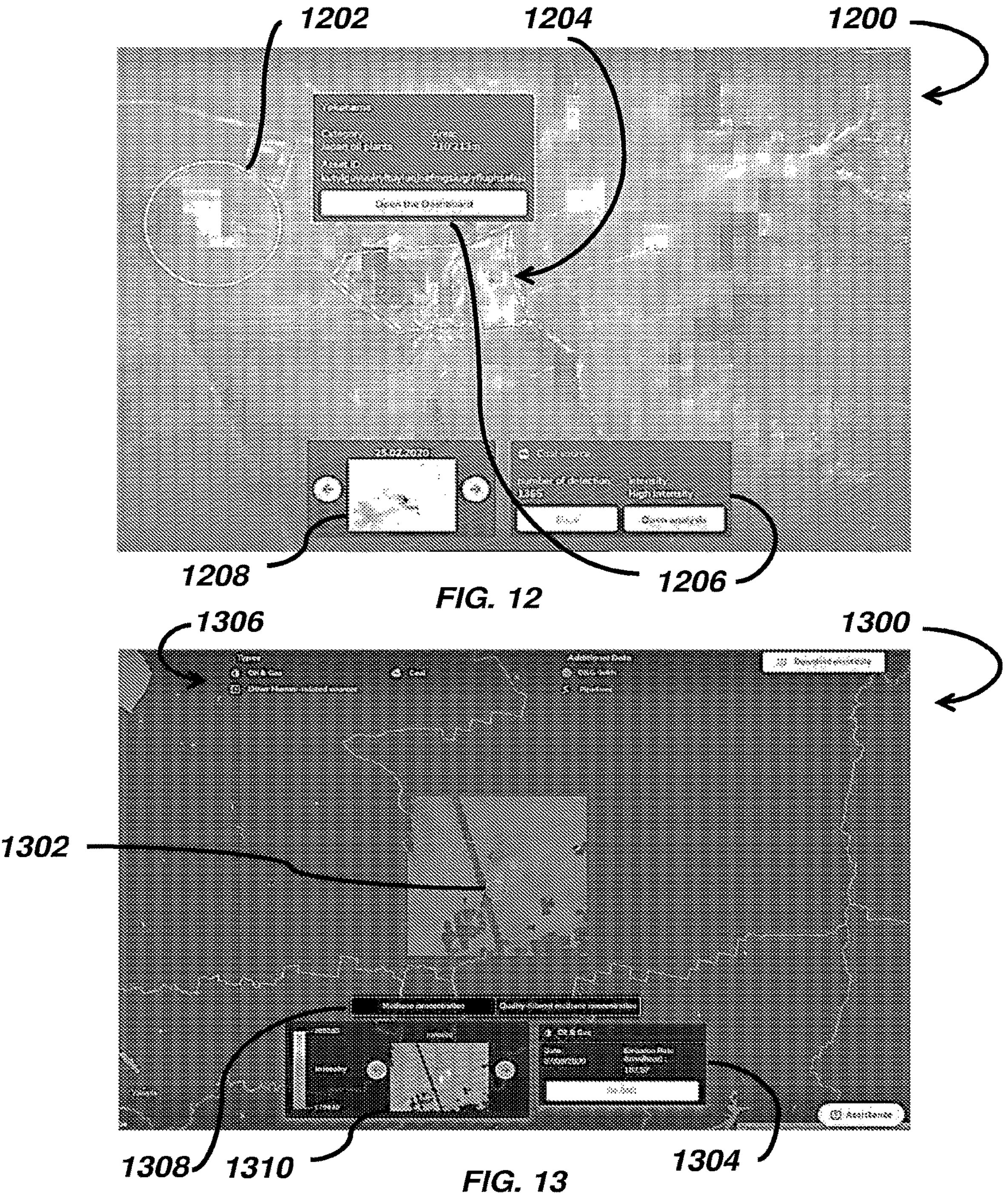
FIGS. 12 through 14 are graphical user interfaces according to the present disclosure.
Figure 14:
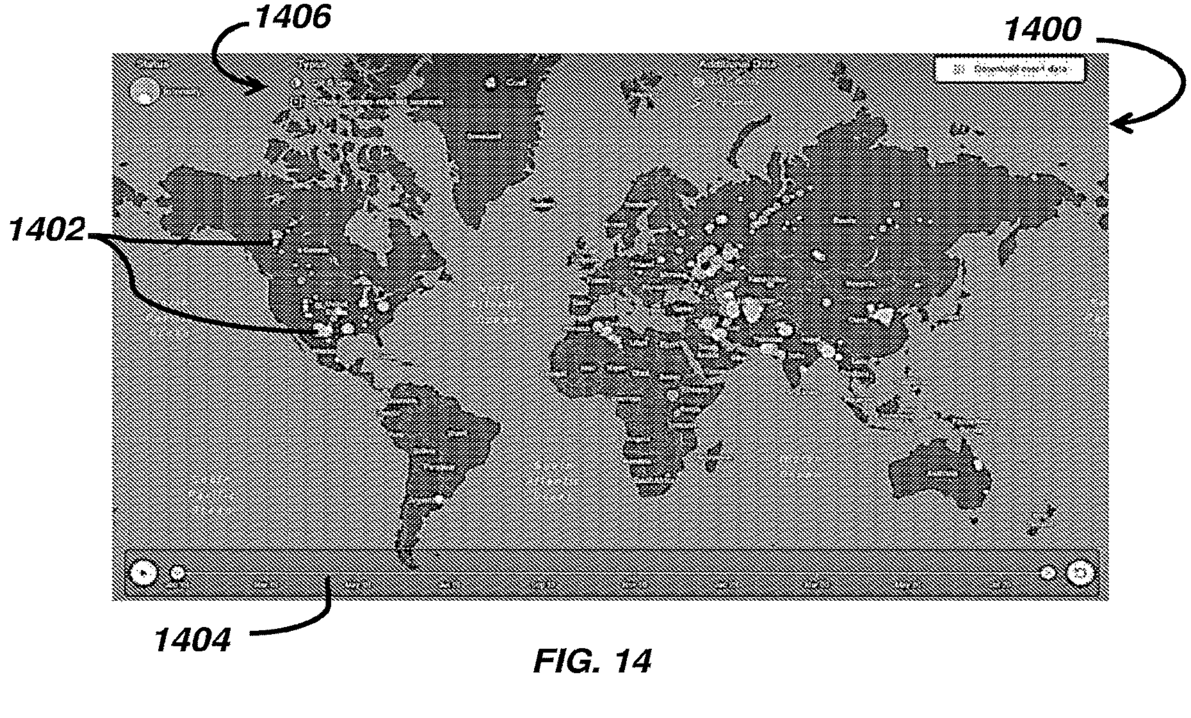

Exemplary graphical user interfaces are illustrated in FIGS. 12 through 14.

FIG. 12 illustrates a graphical user interface (GUI) 1200 according to some embodiments of the present disclosure. The GUI 1200 depicts a single gas emission 1202 within an area of interest including the industrial asset 1204 having a point source from which the gas emission 1202 originates. The GUI 1200 further includes information 1206 relating to the identity of the party responsible for the gas emission, the identity of the industrial asset from which the gas is emitted, a type of industrial asset from which the gas is emitted, a characterization of a severity of the gas emission, which may range between a low intensity and a high intensity, and/or a date of the gas emission. Further, one or more images 1208 obtained and analyzed in the method may be displayed in the GUI 1200. Here, a SWIR image is provided on the GUI 1200.

FIG. 13 illustrates a GUI 1300 according to some embodiments of the present disclosure. The GUI 1300 depicts an area of interest including a point source 1302 from which a gas is emitted and has been detected according to the present disclosure. The GUI 1300 further includes information 1304 relating to the emission rate and date of the gas emission, information 1306 relating to the industry in which the gas was emitted (here, an oil and gas industry and more particularly in an oil and gas production field from a coal formation and including an oil and gas pipeline), information 1308 regarding the type of gas emitted, and/or an image 1310 obtained and analyzed in the method. Here, a SWIR image 1310 highlighting the gas emission is provided on the GUI 1300.

In further embodiments, the detected gas emissions, point sources thereof, and the gas emission rates thereof may be stored in a database. Such information may also be stored with the gas composition, the date of the gas emission, the identification of the party responsible for the actual point source, and/or the geographic location of the point source. Such accumulated information may be displayed in a graphical user interface 1400, as provided in FIG. 14.

The GUI 1400 depicts a plurality of gas emissions 1402. More particularly, the GUI 1400 depicts all gas emissions of a particular gas type globally. Gas emissions 1402 may be depicted on a map at the geographic location of the point source at which the gas is emitted. Gas emissions are indicated as spheres. The size of the spheres varies depending on a size of the gas emission. Gas emissions having a relatively greater emission rate are indicated by larger spheres relative to gas emissions of relatively smaller emission rates. A user may interact with the GUI 1400 and adjust a timeline 1404. Accordingly, the GUI 1400 varies to display gas emissions and locations thereof depending on a selected date. The GUI 1400 may further display information 1406 relating to the industry in which the gas was emitted (here, an oil and gas industry and more particularly in an oil and gas production field from a coal formation and including an oil and gas pipeline). A user may also obtain further information about a particular gas emission by hovering over one of the spheres, which results in the display of additional information, including the emission rate, point source, etc. A user may also obtain more information about a particular gas emission displayed on the user interface 1400 by clicking on one of the spheres. The user may then be provided with one of GUI 1200 or GUI 1300.

All of the foregoing information may be stored so that the information may be queried at a later date. Further all of the foregoing information may be downloaded by a user that includes the information (e.g., data) and/or images obtained during the method described herein.

Potential users of the method and system disclosed herein may include parties responsible for industrial assets (e.g., owners, operators, etc.) for which gas emissions are detected and/or quantified as described herein, regulatory agencies for which gas emissions of the type detected and/or quantified as described herein are to be reported, and/or any other person or entity with an interest in knowledge of gas emissions. By way of non-limiting example, such users may have access to the stored information in order to monitor for gas emissions from point sources owned by the user, when the user is an owner of industrial assets, and/or in order to monitor at a gas emissions of a certain composition that are monitored by and/or reported to regulatory agencies. Such monitoring may be done on a highly local scale, such as on a point source by point source basis or on a highly global scale, as previously described herein.

As a result of monitoring gas emissions according to the present disclosure, users of the method and system may take corrective action when a gas emission is detected. By way of non-limiting example, when the user is the operator of an industrial asset having a point source for which a gas emission has been detected, the operator may take action to repair the point source or take any other action to stop the leak. By way of further non-limiting example, the user may also used to calculate a carbon footprint for a point source, for an industrial asset, for a given industry, for a given geographic area, etc.

One or more of (e.g., each of) the steps 102-120 may be repeated. For example, the steps 102-120 may be repeated on a periodic basis, such as hourly, daily, etc. Accordingly, the present method enables an automated method for globally detecting gas emissions of a gas of interest, quantifying such gas emissions, and attributing such gas emissions over time. Further, repetition of the method and storage of the results of the method allows for the development of a database of global emissions and monitoring of global emissions over an extended period of time.

In additional embodiments, one or more of steps 102-120 may be repeated to detect, quantify, and attribute different gas compositions. In such embodiments, the gas concentration image may comprise gas concentrations of a single gas composition. Therefore, the method may further comprise obtain gas concentration images for a plurality of different gas compositions. Accordingly, the steps 102-120 may be repeated for each gas composition. Accordingly, the present method enables an automatic method for globally detecting any gas of interest, quantifying such gas emissions, and attributing such gas emissions over time.

In yet further embodiments, as previously described, the method may be applied to monitor gas emissions from a known point source. In such embodiments, the method may comprise step 102 through step 114 and step 120. In other words, the attribution step 118 may be unnecessary and, therefore, not performed to monitor the gas emissions of a particular point source. In such embodiments, an initial image acquisition step may obtain a regional gas concentration image rather than a global gas concentration image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "MC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 15 illustrates a block diagram of an example system 1500 that may be configured to perform one or more of the processes described above. The system 1500 is communicatively coupled to a plurality of databases. The plurality of databases may include the databases 1504, 1506, 1508, 1512, 1516, 1520, and 1524. The plurality of databases may obtain images and other data from overhead image acquisition devices 1502, 1510, 1514, 1518, and 1522. In some embodiments, the overhead image acquisition devices 1502, 1510, 1514, 1518, and 1522 may be different satellites comprising different sensors and image acquisitions devices.

The databases 1504, 1506, 1508, 1512, 1516, 1520, and 1524 may be stored on a non-transitory computer-readable storage media (device) as previously described herein. As shown by FIG. 15, the system 1500 may comprise a computing device 1526. The computing device 1526 may comprise a processor 1528, a memory 1530, a storage device 1532, an I/O interface 1534, and a communication interface 1536, which may be communicatively coupled by way of a communication infrastructure 1538. While an example computing device 1526 is shown in FIG. 15, the components illustrated in FIG. 15 are not intended to be limiting. Additional or alternative components may be used in other embodiments. Furthermore, in certain embodiments, the computing device 1526 can include fewer components than those shown in FIG. 15. Components of the computing device 1526 shown in FIG. 15 will now be described in additional detail.

In one or more embodiments, the processor 1528 includes hardware for executing instructions, such as those making up a computer program. By way of non-limiting example, to execute instructions, the processor 1528 may retrieve (or fetch) the instructions from an internal register, an internal cache, the memory 1530, or the storage device 1532 and decode and execute the instructions. In one or more embodiments, the computing device 1526 may include one or more internal caches for data, instructions, or addresses. By way of non-limiting example, the computing device 1526 may include one or more instruction caches, one or more data caches, and one or more translation look aside buffers (TLBs). Instructions in the instruction caches may be copies of instructions in the memory 1530 or the storage 1532.

The computing device 1526 includes memory 1530, which is coupled to the processor 1528. The memory 1530 may be used for storing data, metadata, and programs for execution by the processor(s) 1528. The memory 1530 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1530 may be internal or distributed memory.

The computing device 1526 includes the storage device 1532 that includes storage for storing data or instructions. By way of non-limiting example, storage device 1532 can comprise a non-transitory storage medium described above. The storage device 1532 may include a hard disk drive (HDD), a floppy disk drive, flash memory, an optical disc, a magneto-optical disc, magnetic tape, or a Universal Serial Bus (USB) drive or a combination of two or more of these. The storage device 1532 may include removable or non-removable (or fixed) media, where appropriate. The storage device 1532 may be internal or external to the computing device 1526. In one or more embodiments, the storage device 1532 is non-volatile, solid-state memory. In other embodiments, the storage device 1532 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1526 also includes one or more input or output ("I/O") devices/interfaces 1534, which are provided to allow a user to provide input to, receive output from, and otherwise transfer data to and receive data from computing device 1526. The I/O devices/interfaces 1534 may include a mouse, a keypad or a keyboard, a touch screen, a camera, an optical scanner, network interface, modem, other known I/O devices or a combination of such I/O device/interfaces. The touch screen may be activated with a stylus or a finger.

The I/O devices/interfaces 1534 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1534 is configured to provide graphical data to a display for presentation to a user. The graphical data may be representative of one or more graphical user interfaces and/or any other graphical content as may serve a particular implementation.

The computing device 1526 can further include a communication interface 328. The communication interface 1536 can include hardware, software, or both. The communication interface 1536 can provide one or more interfaces for communication (such as, for example, packet-based communication) between the computing device 1526 and one or more other computing devices or networks. As an example and not by way of limitation, the communication interface 1536 may include a network interface controller (NIC) or network adapter for communicating with an Ethernet or other wire-based network or a wireless MC (WNIC) or wireless adapter for communicating with a wireless network, such as a WI-FI. The computing device 1526 can further include a bus. The bus can comprise hardware, software, or both that couples components of computing device 1526 to each other.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure, including legal equivalents thereof. In addition, features from one embodiment may be combined with features of another embodiment while still being encompassed within the scope of the invention as contemplated by the inventors.

What is claimed is:

1. A method for monitoring gas emissions, the method being executed by a processor and comprising the steps of:

obtaining an image of a gas concentration within a first area of interest from an overhead image acquisition device;

detecting from the image of the gas concentration at least one gas plume of a synthetic gas emission;

quantifying an emission rate of the detected gas plume;

estimating an estimated point source of the detected gas plume; and attributing the detected gas plume to an actual point source, wherein attributing the detected gas plume to the actual point source comprises obtaining an infrared image of a second area of interest including the estimated point source and analyzing the infrared image to detect a gas emission from an amount of variation in infrared light intensity within the infrared image.

2. The method of claim 1, further comprising automatically generating a report of the detected gas plume, the emission rate, and the actual point source and transmitting the report to a user such that the user is provided with up-to-date information about regional or global synthetic gas emissions.

3. The method of claim 2, wherein the report further comprises at least one of a gas composition, a date of the gas emission, an identification of a party responsible for the actual point source, and a geographic location of the actual point source.

4. The method of claim 2, further comprising automatically generating a graphical user interface indicating the detected gas plume, the emission rate, and the actual point source such that the graphical user interface provides up-to-date information about regional or global synthetic gas emissions.

5. The method of claim 4, wherein the graphical user interface further indicates at least one of a gas composition, a date of the gas emission, an identification of a party responsible for the actual point source, and a geographic location of the actual point source.

6. The method of claim 1, wherein quantifying an emission rate of the detected gas plume comprises using at least one of a mass balance method, an integrated mass enhancement, and a cross-section method.

7. The method of claim 1, further comprising obtaining meteorological data within the first area of interest corresponding to a time period during which the detected gas plume is estimated to be emitted, the meteorological data comprising a wind velocity and a wind direction for the time period, and quantifying the emission rate of the detected gas plume based on a displacement of the detected gas plume as a result of interaction of the detected gas plume with an atmosphere.

8. The method of claim 1, wherein detecting the gas emission comprises detecting a gas emission having a concentration above a background threshold such that natural gas emissions and other gases in the atmosphere are not detected.

9. A non-transitory computer-readable medium storing instructions that, when executed by a computer, cause that computer to implement the method of claim 1.

10. A system for monitoring gas emissions, comprising:

a memory storing a gas concentration image of a first area of interest; and a processor communicatively coupled to the memory and configured to:

detect from the gas concentration image at least one gas plume of a synthetic gas emission;

quantify an emission rate of the detected gas plume;

estimate an estimated point source of the detected gas plume;

obtain an infrared image of a second area of interest including the estimated point source;

analyze the infrared image to detect a gas emission from an amount of variation in infrared light intensity within the infrared image; and attribute the detected gas plume to an actual point source based upon the detected gas emission.

11. A method for monitoring gas emissions, the method being executed by a processor and comprising the steps of:

obtaining a gas concentration image of a first area of interest from an overhead image acquisition device;

detecting from the gas concentration image at least one gas plume of a synthetic gas emission;

quantifying an emission rate of the gas plume detected from the gas concentration image;

estimating an estimated point source of the gas plume detected from the gas concentration image;

obtaining another image of a second area of interest, the another image being one of an infrared image or an Synthetic Aperture Radar (SAR) image;

detecting from the another image of the second area of interest at least one gas plume of a synthetic gas emission; and attributing the detected gas plume to an actual point source based upon the detection of gas plumes in the gas concentration image and the another image.

12. The method of claim 11, wherein the second area of interest comprises a plurality of point sources of the gas plume, and wherein attributing the gas plume to the actual point source comprises obtaining geographic locations of the plurality of point sources and comparing a geographic location of the estimated point source to the geographic locations of the plurality to identify a closest geographic fit as the actual point source.

13. The method of claim 11, wherein the another image is an infrared image, and wherein detecting the at least one gas plume from the another image comprises analyzing the infrared image to detect a gas emission from an amount of variation in infrared light intensity within the infrared image.

14. The method of claim 11, wherein each of the first area of interest and the second area of interest include a plurality of point sources, wherein the second area of interests includes fewer point sources than the first area of interest.

15. A non-transitory computer-readable medium storing instructions that, when executed by a computer, cause that computer to implement the method of claim 11.

* * * * *